US009596554B2

(12) United States Patent
Sherman

(10) Patent No.: US 9,596,554 B2
(45) Date of Patent: Mar. 14, 2017

(54) METHODS CIRCUITS DEVICES SYSTEMS AND ASSOCIATED COMPUTER EXECUTABLE CODE FOR ACQUIRING ACOUSTIC SIGNALS

(71) Applicant: Vladimir Sherman, Tel Aviv (IL)

(72) Inventor: Vladimir Sherman, Tel Aviv (IL)

( * ) Notice: Subject to any disclaimer, the term of this patent is extended or adjusted under 35 U.S.C. 154(b) by 0 days.

(21) Appl. No.: 14/721,235

(22) Filed: May 26, 2015

(65) Prior Publication Data

US 2015/0341734 A1    Nov. 26, 2015

Related U.S. Application Data

(60) Provisional application No. 62/002,990, filed on May 26, 2014, provisional application No. 62/039,440, filed on Aug. 20, 2014.

(51) Int. Cl.
| | | |
|---|---|---|
| H04R 3/00 | (2006.01) | |
| H04R 1/02 | (2006.01) | |
| H04R 5/00 | (2006.01) | |
| H04R 25/00 | (2006.01) | |
| H04R 5/02 | (2006.01) | |
| H04R 29/00 | (2006.01) | |
| G10K 11/16 | (2006.01) | |
| G01S 3/80 | (2006.01) | |
| H04R 5/033 | (2006.01) | |
| G10K 11/34 | (2006.01) | |

(Continued)

(52) U.S. Cl.
CPC .......... *H04R 29/005* (2013.01); *G01S 3/8006* (2013.01); *G10K 11/16* (2013.01); *G10K 11/341* (2013.01); *H04R 5/033* (2013.01); *H04R 25/407* (2013.01); *G02C 11/06* (2013.01); *G02C 11/10* (2013.01); *H04R 1/028* (2013.01); *H04R 1/1083* (2013.01); *H04R 1/406* (2013.01); *H04R 3/005* (2013.01); *H04R 25/43* (2013.01); *H04R 2201/405* (2013.01); *H04R 2225/43* (2013.01); *H04R 2499/15* (2013.01)

(58) Field of Classification Search
CPC ...... H04R 3/005; H04R 1/1083; H04R 1/406; H04R 25/407; H04R 2201/405; H04R 2499/11; H04R 2499/13
USPC .... 381/92, 1, 22, 23, 17, 91, 381, 374, 375, 381/26, 23.1, 300; 38/110
See application file for complete search history.

(56) References Cited

U.S. PATENT DOCUMENTS

| | | |
|---|---|---|
| 4,773,095 A | 9/1988 | Zwicker et al. |
| 6,570,555 B1 | 5/2003 | Prevost et al. |

(Continued)

OTHER PUBLICATIONS

PCT Appl. No. PCT/IB15/53938 International Search Report and Written Opinion dated May 26, 2015 (9 pages).

*Primary Examiner* — Thjuan K Addy
(74) *Attorney, Agent, or Firm* — Vladimir Sherman; Professional Patent Solutions

(57) ABSTRACT

The present invention includes methods, circuits, devices, systems and associated computer executable code for acquiring, processing and rendering acoustic signals. According to some embodiments, one or more direction specific audio signals may be generated using a microphone array comprising two or more microphones and an audio stream generator. The audio stream generator may receive a direction parameter from an optical tracking system. There may be provided an audio rendering system adapted to normalize and/or balance acoustic signals acquired from a soundscape.

22 Claims, 9 Drawing Sheets

(51) Int. Cl.
  *G02C 11/06*  (2006.01)
  *H04R 1/10*  (2006.01)
  *H04R 1/40*  (2006.01)
  *G02C 11/00*  (2006.01)

(56) References Cited

U.S. PATENT DOCUMENTS

| | | |
|---|---|---|
| 6,769,767 B2 * | 8/2004 | Swab .................... G02C 11/10 |
| | | 351/158 |
| 7,348,922 B2 | 3/2008 | Chang et al. |
| 7,609,842 B2 | 10/2009 | Sipkema et al. |
| 9,100,097 B2 * | 8/2015 | Li |
| 2004/0013038 A1 | 1/2004 | Kajala et al. |
| 2004/0015364 A1 | 1/2004 | Sulc |
| 2004/0136541 A1 | 7/2004 | Hamacher et al. |
| 2010/0074460 A1 | 3/2010 | Marzetta |
| 2013/0142358 A1 | 6/2013 | Schultz et al. |
| 2013/0300648 A1 | 11/2013 | Kim et al. |
| 2013/0317830 A1 | 11/2013 | Visser et al. |
| 2015/0172814 A1 * | 6/2015 | Usher .................... H04R 3/005 |
| | | 381/92 |

\* cited by examiner

METHODS CIRCUITS DEVICES SYSTEMS AND ASSOCIATED COMPUTER EXECUTABLE CODE FOR ACQUIRING ACOUSTIC SIGNALS

RELATED APPLICATIONS

The present application claims priority from U.S. Provisional Patent Application Ser. Nos. (1) 62/002,990, filed on May 26, 2014; and (2) 62/039,440, filed on Aug. 20, 2014. The full text and figures of both of these patent applications is hereby incorporated by reference in its entirety.

FIELD OF THE INVENTION

The present invention relates generally to the field of acoustic signal or sound acquisition. The present invention relates to processing of audio signals. The present invention also relates to circuits, devices, systems and associated computer executable code for acquiring, processing and audio rendering directional acoustic signals.

BACKGROUND

Hearing loss, deafness, hard of hearing, hearing impairment, is a partial or total inability to hear. In children it may affect the development of language and can cause work related difficulties for adults. It may be caused by many factors, including: genetics, aging, exposure to noise, illness, chemicals and physical trauma. While the results of hearing tests are expressed in decibels, hearing loss is usually described as mild, mild-moderate, moderate, moderately severe, severe, or profound.

Hearing loss is usually acquired by a person who at some point in life had no hearing impairment. Globally hearing loss affects about 10% of the population to some degree. There are a number of measures that can prevent hearing loss, including avoidance of loud noises, chemical agents, and physical trauma.

For those requiring hearing assistance due to hearing loss, there are hearing aids, which are generally electroacoustic devices designed to amplify sound for the wearer, usually with the aim of making speech more intelligible. Earlier devices, known as ear trumpets or ear horns, were passive funnel-like amplification cones designed to gather sound energy and direct it into the ear canal. Similar devices include the bone anchored hearing aid, and cochlear implant.

A major drawback of all hearing aids provided to date is their inability to spatially separate background noise from sound of interest which the wearer wishes to hear.

Wearable computing devices, also known as body-borne computers or wearables are miniature electronic devices that are worn by the bearer under, with or on top of clothing. Wearables have been developed for general or special purpose information technologies and media development.

There is a need for improved methods, circuits, devices, systems and associated computer executable for acquiring, processing and rendering acoustic signals, optionally using a wearable computing device.

SUMMARY OF THE INVENTION

The present invention may include methods, circuits, devices, systems and associated machine executable code for acquiring acoustic signals such as human speech and/or various other sound types. According to further embodiments, the present invention may include methods, circuits, devices, systems and associated machine executable code for processing, normalization, balancing, and/or audio rendering acquired acoustic signals such as human speech and/or other sounds audible. According to yet further embodiments, the present invention may include methods, circuits, devices, systems and associated machine executable code for transcribing, translating and/or graphically rendering acquired human speech. The present invention includes methods, circuits, devices, systems and associated computer executable code for dynamically targeting a directivity of an acoustic signal (e.g. sound) acquisition assembly towards a direction of a sound source (e.g. a human speaker) identified and/or tracked by an optical tracking system.

According to embodiments, there may be provided a mobile computing device, such as a wearable computing device, including: (1) an electrically configurable acoustic signal (i.e. sound) acquisition assembly whose operation and optionally directivity may be dynamically altered by an electrical signal; and (2) an optical tracking system adapted to optically track one or more sound sources and to output to the acoustic signal acquisition assembly an electrical signal or indicator to adjust operation and/or directivity of the acoustic signal acquisition assembly so as to acquire acoustic signals from a direction of an optically tracked sound source while substantially suppressing, discarding, excluding, and/or otherwise masking acoustic signal information from directions other than that of the optically tracked sound source. According to embodiments, the optical tracking system may be adapted to update its output electrical signal or indicator as the target sound source moves relative the computing device, thereby causing the directivity of the acoustic signal acquisition assembly to change and track the moving sound source, without the assembly physically moving.

According to some embodiments, the mobile device may be in the form of eyewear having an array of microphones disposed across and within the frame and/or stems of the eyewear. According to such embodiments, the optical tracking system may include a forward looking optical image sensor and/or the optical tracking system may include an inward facing optical eye tracking sensor. The eyewear embodiment may also include a communication interface, wired or wireless, to connect the eyewear to a smartphone which may be used as a user interface for the eyewear. A touchscreen of the smartphone may be used to view potential tracking targets and to select one or more potential targets for actual tracking by the optical tracking system. The smartphone may also be used to provide machine transcription (i.e. speech-to-text) for speech acquired through the acoustic acquisition assembly of the eyewear. The smartphone may also be used to provide machine translation for speech acquired through the acoustic acquisition assembly of the eyewear.

According to some embodiments, the mobile device may be in the form of headphones having an array of microphones disposed across and within the body and frame of the headphones. According to such embodiments, the optical tracking system may include a forward looking optical image sensor on a forward facing surface of the headphones. The headphones embodiment may also include a communication interface, wired or wireless, to connect the headphones to a smartphone which may be used as a user interface for the headphones. A touchscreen of the smartphone may be used to view potential tracking targets and to select potential target for tracking by the optical tracking system. The smartphone may also be used to provide machine transcription (i.e. speech-to-text) functionality for speech acquired through the acoustic acquisition assembly of the headphones. The smartphone may also be used to provide machine translation functionality for speech acquired through the acoustic acquisition assembly of the headphones.

According to aspects of the present invention, there may be provided optical sensor guided directional audio signal (or audio stream) generation, wherein directional audio signal/stream generation may include one or more of: (a) microphone selection, (b) acoustic beam-forming, and/or (c) acoustic beam-steering. According to embodiments, an optical tracking system including an optical sensor assembly (e.g. CCD or CMOS with optics) and tracking circuits (e.g. processor(s) executing image feature identification and tracking algorithms) may generate a signal or indicator to guide the directional audio stream generation. Directional audio signal/stream (also referable to as "directional audio signal") generation may be performed with an acoustic microphone array integral or otherwise functionally associated with audio signal processing circuits configured or programmed as a directional audio stream generator.

According to some embodiments of the present invention, there may be provided an electrically configurable acoustic acquisition assembly which may include a microphone array having two or more microphones positioned at some distance from one another, wherein each of the microphones may be adapted to convert acoustic signals (i.e. sound) which arrive at the microphones into electrical signals such as analog or digital audio signals. The microphone array may include sets of matched microphones, wherein matched microphones may have substantially identical frequency response characteristics and/or directivity characteristics. The microphone array may include microphones which are omni-directional microphones, poly-directional microphones and/or directional microphones.

Directional microphones of an array according to embodiments of the present invention may be positioned and/or affixed within the array to have differing directivities and to facilitate differing acoustic signal acquisition coverage regions. Directivity of array microphones may be fixed relative to the microphone structure or may be electrically steerable as taught by the MEMS microphone shown in U.S. patent application Pub. No. US20130142358 A1. According to some embodiments, acoustic signal acquisition coverage region(s) of each of two separate directional microphones of an array according to embodiments may overlap, partially or completely. Any directional microphone structures known today or to be devised in the future may be applicable to aspects of the present invention.

Microphones of an array according to some embodiments may have either an analog signal output or a digital signal output (e.g. I$^2$O or I$^2$S) output. According to some embodiments of the present invention, there may be a mix of analog and digital microphones on the same array. According to embodiments of the present invention including analog microphones, there may be provided analog signal to digital signal conversion circuits ("A/D") for sampling and digitizing output signals from the analog microphones.

The electrically configurable acoustic signal acquisition assembly may be integral with, include and/or be otherwise electrically coupled to a Directional Audio Stream Generator (DASG), which DASG may be adapted to select, activate, receive and/or sample output signals from one or more of the array microphones. The DASG may be adapted to convert electrical audio signal outputs from one or more of the array microphones into a direction specific electrical audio signal, digital or analog. A direction specific electrical audio signal (also referable to as "direction specific audio signal" or "DSAS") generated for a specific direction relative to the array (e.g. 30 degrees left of tangential axis of array), may be an electrical signal which is generated and/or modulated so as to: (a) predominantly include or carry acoustic signal information from acoustic signals which arrived at the microphone(s) from the specific direction, also referable to as the specific Direction Of Arrival (DOA); and (b) substantially suppresses, discard, exclude, lack and/or otherwise mask acoustic signal information from acoustic signals which arrived at the microphone(s) from directions other than the specific direction.

The DASG may convert array microphone output signals, analog or digital, into a DSAS for a given acoustic signal DOA by: (a) selecting and/or sampling an output of one or more array microphones whose directivity overlaps with the given acoustic signal DOA; (b) acoustic beamforming and/or acoustic beam-steering of array microphone output signals into a beam-formed audio signal with a directivity aimed towards the given acoustic signal DOA; and/or (c) a combination of array microphone selection, activation, output sampling, and beamforming of the outputs of the selected array microphones. Some of the array microphones may be directional microphones and the DASG may include microphone selection circuits which may select which microphones to activate or otherwise utilize in generating a direction specific audio signal. Additionally, the DASG may include one or more signal combining circuits to combine signals from selected directional and/or omni-directional microphones. The DASG may include acoustic beamforming circuits to generate an acoustically beam-formed audio signal with a steerable directivity, wherein input audio signals originating at the array microphones may be received by the beamforming circuits: (a) directly from all or a subset of array microphones, (b) from microphone selection circuits which direct selected microphone output signals to the beamforming circuits, (c) from signal combining circuits which may combine microphone output signals, and/or (d) some combination of (a) through (c).

According to embodiments, the DASG may include background noise subtraction or removal functionality. According to such embodiments, during or after generation of a DSAS associated with an intended DOA, sound signal components which are estimated to be background noise may be subtracted from the DSAS. Background noise may be estimated by sampling audio signals from array microphones having directivity other than the intended DOA. It should be understood, however, that any acoustic noise cancellation circuits, algorithms and/or techniques known today or to be devised in the future may be applicable to the present invention.

A device according to some embodiments may include an optical tracking system (OTS) adapted to optically track one or more sound sources and to provide a direction indicator or signal indicating a direction of a tracked sound source relative to the device. The optical tracking system may include an optical sensor assembly with an optical image sensor and with one or more lenses, which optical sensor may be disposed on or within the device to face forward and to acquire image information from a scene in front of the device. Image processing algorithms, such as feature identification (e.g. torso and/or face identification) algorithms and/or identified-feature-tracking algorithms may be executed by either dedicated or multi-purpose processing circuitry in order to track and estimate a relative direction of a sound source such as a human face. The OTS may be further adapted to provide the estimated relative direction to a DASG of the device, in the form of a signal, indicator or parameter, generated once, intermittently or substantially continuously.

According to some embodiments, the OTS may be adapted to track two or more sound sources at the same time. According to such embodiments, the OTS may generate a separate signal or indicator for each tracked source. According to such embodiment, the DASG may be adapted to generate a separate DSAS for each tracked sources. Each DSAS may be generate using: (a) a separate set one or more directional microphones, which sets may overlap; (b) a separate acoustic beam-forming processing chain; and/or (c) a combination of (a) and (b).

According to further embodiments, there may be provided an optical sensor assembly which faces an eye of a user of the device. Image processing algorithms adapted to convert an image of an eye of a user into an estimated viewing angle of the eye of a user may be executed by either dedicated or multi-purpose processing circuitry. The viewing angle estimate may be used in order to further estimate a relative direction of a sound source being looked at by the user. The OTS may be further adapted to provide the estimated relative direction to a DASG of the device, in the form of a signal, indicator or parameter, generated once, intermittently or substantially continuously.

According to some embodiments, a DSAS may be sent audio rendering circuits driving one or more speakers. The DSAS may be in the form of a digital signal and the audio rendering circuits may include one or more digital to analog converters (D/A). The rendering circuits may also include an adjustable amplifier, optionally a separate amplifier for each speaker. According to further embodiments, each audio rendering output chain of the audio rendering circuits may be configured (e.g. using a digital filter or a digital amplifier) with a signal transfer characteristic specific to an ear of a specific user.

A device according to embodiments of the present invention may include one or more speakers connected output ports of the audio rendering circuits. The connection between the speakers and one or more output ports may be wired or wireless (e.g. Bluetooth). According to some embodiments, each of two speakers may be a connected to a separate output port of the audio rendering circuits and each of the speakers may be integral or otherwise functionally associated with an ear interface such an earbud or a headphone.

A device according to yet further embodiments may include a display assembly, for example in the form of an eye projector on eyewear. The display assembly may provide a user with transcriptions and/or translations of device acquired speech. The display may also be used as part of an interface for: (a) selection of a sound source to track; and (2) indicating towards which sound sources a DSAS is being directed.

Embodiments of the present invention include optical sensors and circuits to generate signals to adjust a directivity of a dynamically adjustable acoustic sensor array.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
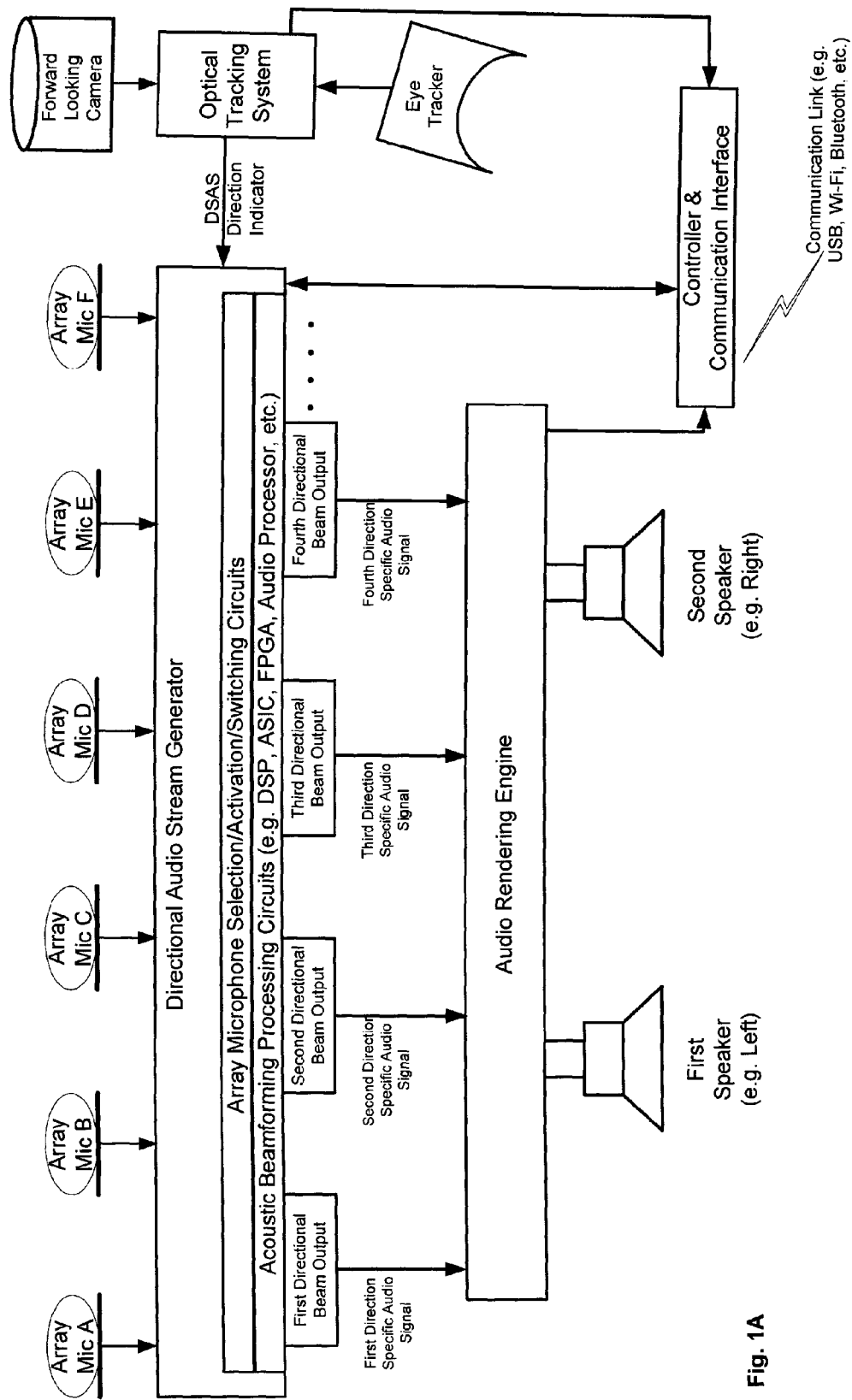
FIG. 1A shows a functional block diagram of an exemplary acoustic signal acquisition device according to embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to embodiments, a direction specific audio signal or audio data stream may be generated by applying one or more direction parameters derived from an optical tracking system to analog and/or digital circuits associated with a microphone array. The microphone array may include omnidirectional microphones, directional microphones or a combination of both. The optical tracking system may track features of one or more objects, a position of an eye or a combination of both. The analog and/or digital circuits associated with the microphone array may include microphone driver circuits, microphone selection circuits, signal conditioning circuits, amplifier circuits, signal combining circuits, signal subtraction circuits, signal filtering circuits, analog acoustic beamforming circuits, analog to digital converters, digital filters, digital acoustic beamforming circuits, and/or audio rendering circuits.

Turning now to FIG. 1A, there is shown a functional block diagram of an exemplary acoustic signal acquisition device according to embodiment of the present invention. The device may include an acoustic acquisition assembly with a set or array of microphones having a fixed spacing and orientation relative to one another. The assembly may be integral or otherwise functionally associated with a Directional Audio Stream Generator (DASG) which receives sound source target direction signals, indicators, parameters and vectors from an Optical Tracking System (OTS). The DASG may include microphone selection circuits to select one or more array microphones, switching circuits to access the selected microphone terminals or ports, and activation or driving circuits to activate and drive selected microphones.

Figure 4A:
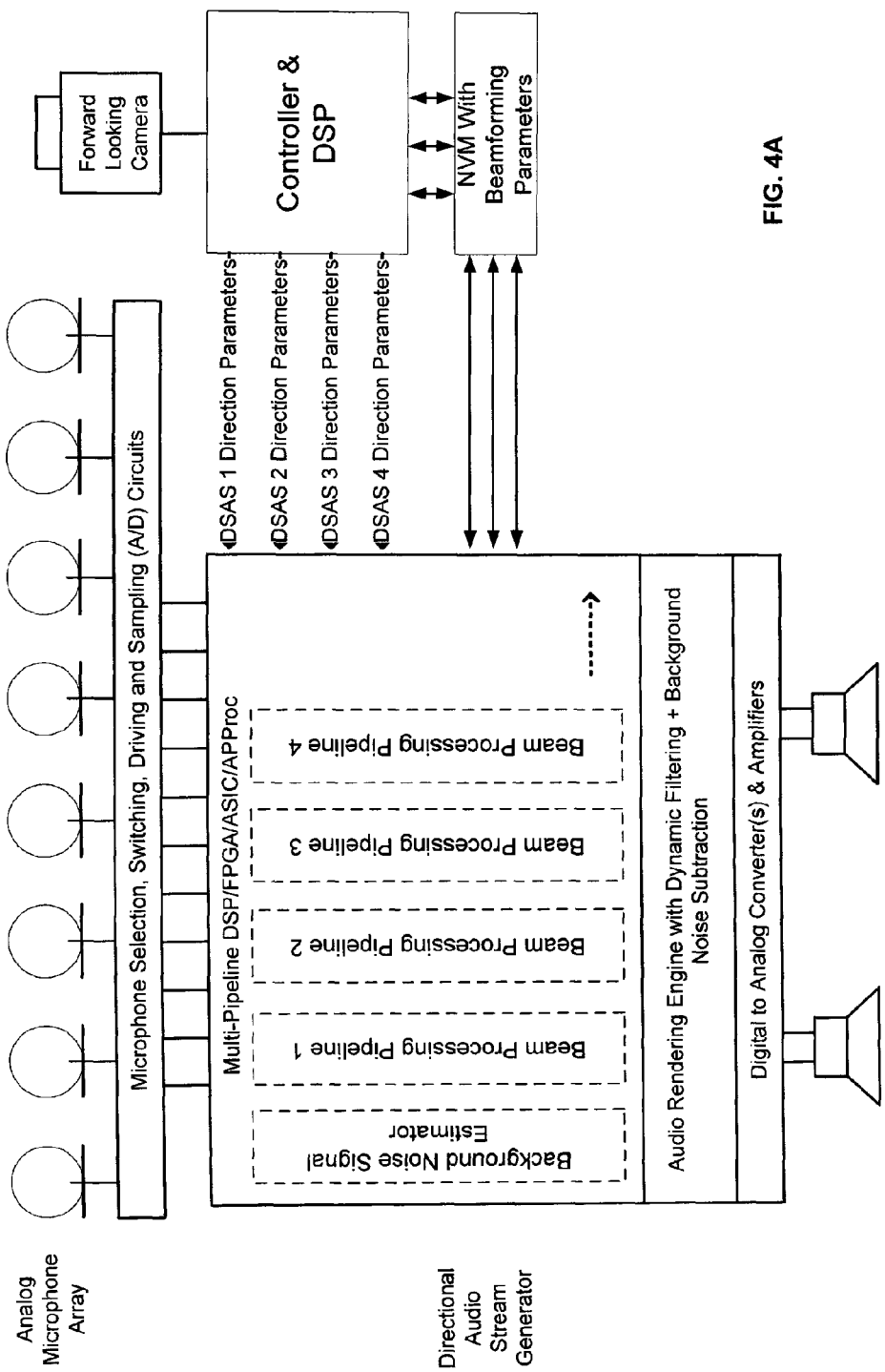
FIGS. 4A and 4B show functional block diagrams of embodiments of the present invention including analog microphones and digital microphones, respectively.
Figure 4B:
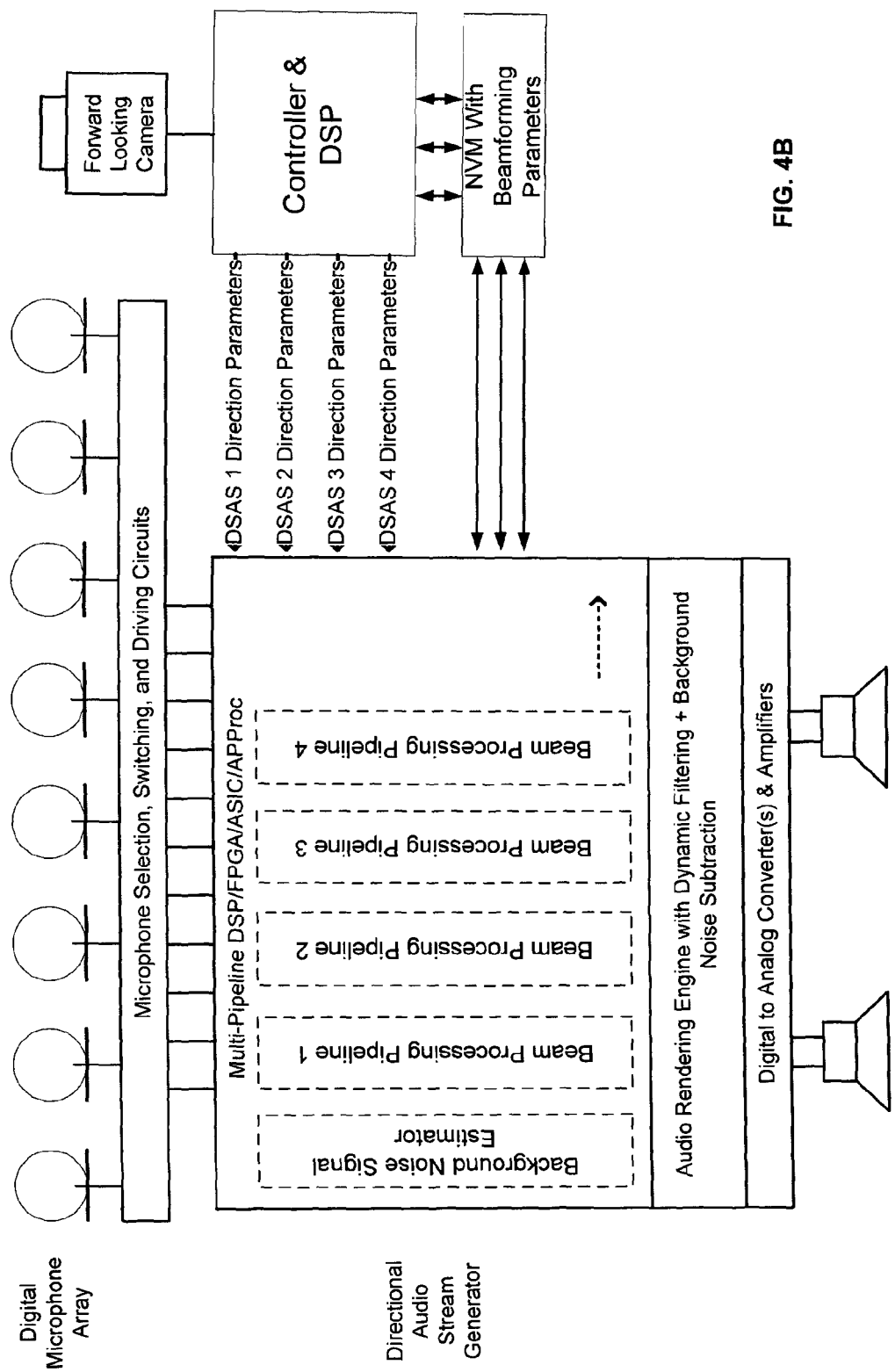

According to some embodiments, the microphone selection circuits may select one or more array microphones with a directivity corresponding to a target direction. A Direction Specific Audio Stream or Signal (DSAS) may include only signals from one or more selected directional microphones. Alternatively, acoustic beamforming may be applied to microphone outputs of two or more microphones. The DASG may include acoustic beamforming circuits for generating the DSAS, for example as analog acoustic beamforming circuits. According to examples where the DASG includes digital acoustic beamforming circuits and the microphones have analog outputs, the DSAG may also include an analog to digital converter (D/A) to convert. FIG. 4A shows an embodiment of the present invention where the array microphones are analog microphones and the DASG includes digital acoustic beamforming processing pipelines running on processing circuitry (e.g. DSP, FPGA, ASIC, or processor). FIG. 4B shows an embodiment of the present invention where the array microphones are digital microphones and the DASG includes digital acoustic beamforming processing pipelines running on processing circuitry (e.g. DSP, FPGA, ASIC, or processor). According to some embodiments, the beamforming circuit may include a combination of analog and digital beamforming components. Any acoustic beamforming circuits, technologies or techniques known today or to be devised in the future may be applicable to aspects of the present invention.

The OTS is integral or connected to a forward looking camera and the optical processing circuits in the OTS may include feature identification processing to identify one or more features of objects or persons present in front of the device. The one or more features may be a human torso portion, a human face, a human lip, a video presentation device, an audio presentation device, and any potential acoustic signal source. The OTS may include processing to estimate a direction parameter indicative of a direction corresponding to one or more identified features. The direction parameter may indicate a relative direction between the device and an identified object. At least one separate direction parameter may be generated for each of two or more separate identified features associated with each of two or more separate objects or persons, for example to two or more separate people.

The direction parameter for a given identified feature of a given object or person may be used by the DASG to select which microphones of the microphone array may be utilized in collecting acoustic signals emanating from the given object or person. The direction parameter for a given object may be used to calculate beamforming parameters, such as beamforming coefficients utilized in steering an acoustic beam towards the given object or person and collecting acoustic signals emanating from the given feature. The direction parameter for a given identified feature may be used for both microphone selection and beamforming parameter calculation.

A device according to an embodiment of FIG. 1A also may include an eye tracker for tracking a position of an eye of a wearer of the device. The eye tracker may be implemented with an optical tracking system aimed at a wearer's eye. The optical tracking system may be implemented using any tracking technology known today or to be devised in the future. The eye tracker may include processing to estimate a direction parameter indicative of a device wearer's viewing direction as indicated by a position of a tracked eye of the wearer.

The audio rendering assembly of FIG. 1A may include one or more audio speakers and an audio signal rendering circuits (engine) adapted to drive each of said one or more speakers. The audio signal generator may be adapted to generate one or more audio signals based on the first direction specific audio signal. The audio signal generator may be adapted to generate a separate audio signal for each of two speakers, wherein a relative volume and delay between the separate signals may be based on the first acoustic signal direction of arrival. The audio signal generator may include ear specific signal customization circuits to adapt an audio signal based on a frequency sensitivity of a specific ear. The audio signal generator may include background noise suppression circuits.

Figure 3A:
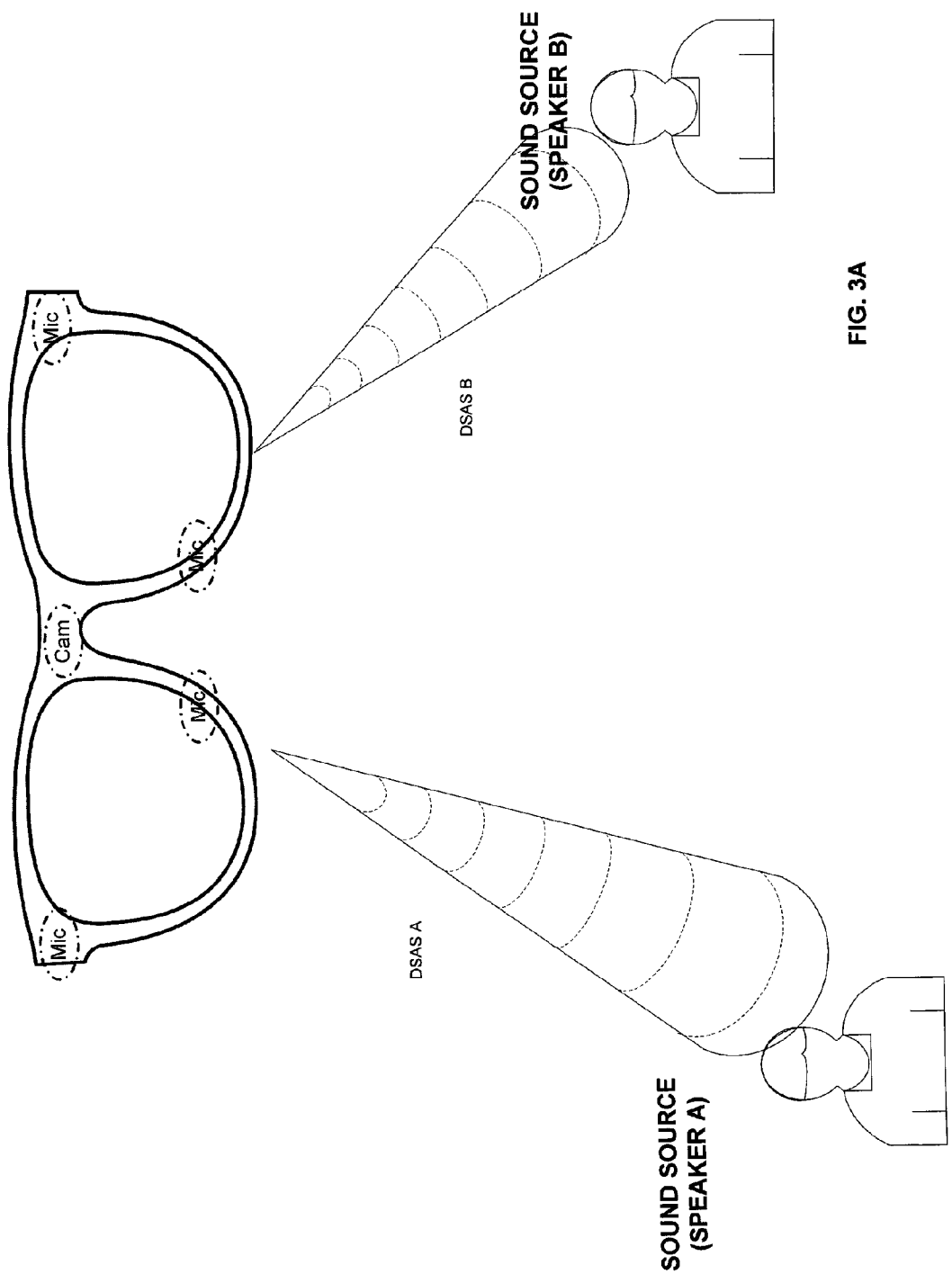
FIGS. 3A to 3D show illustrated use cases of a device according to embodiments.
Figure 3B:
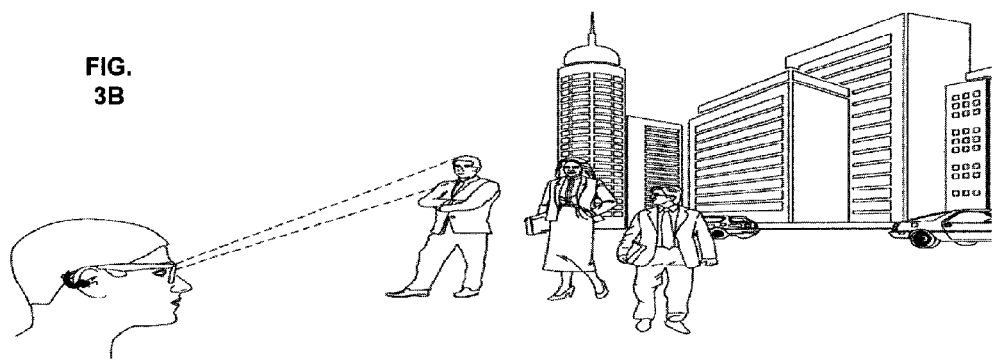
Figure 3C:
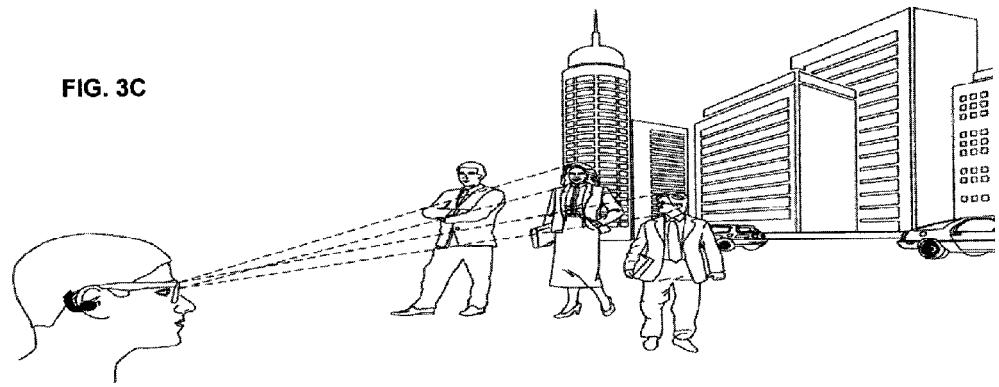
Figure 3D:

According to further embodiments, the OTS may be adapted to: (1) track a change in relative direction between the device and an identified feature of an object, and (2) update the at least one direction parameter used by said DASG to generate the first stream of audio data. The OTS may be also be adapted to track two or more identified features and to generate separate direction parameters for each of the two or more identified features. FIG. 3A shows an embodiment of the present invention where the device is in the form of eyewear and the OTS is tracking to separate people. A separate DSAS is generated for each of the two tracked sound sources (i.e. people). FIGS. 3B through 3D show scenarios where the OTS tracks both static and moving sound sources and a DSAS for the tracked people (sound acquisition targets) is adjusted or steered accordingly. Also shown is a user starting and discontinuing tracking and sound acquisition for a specific sound sources at will.

According to yet further embodiments, the device may include user interface circuits adapted to allow a wearer to select for which identified feature a direction specific audio signal is generated. The interface circuits may include a display selected from the group consisting of: (1) a functionally associated touchscreen, and (2) optical head mounted display. The interface circuits may receive user input from the tracker. The interface circuits may receive user input from the functionally associated touchscreen. The interface circuits may include one or more electric buttons, switches or gauges on the device. FIGS. 1A, 2A and 2B, 2C and 2D show embodiments including interface circuits to connect the devices to smartphones which may be used as part of the user interface.

Figure 1B:
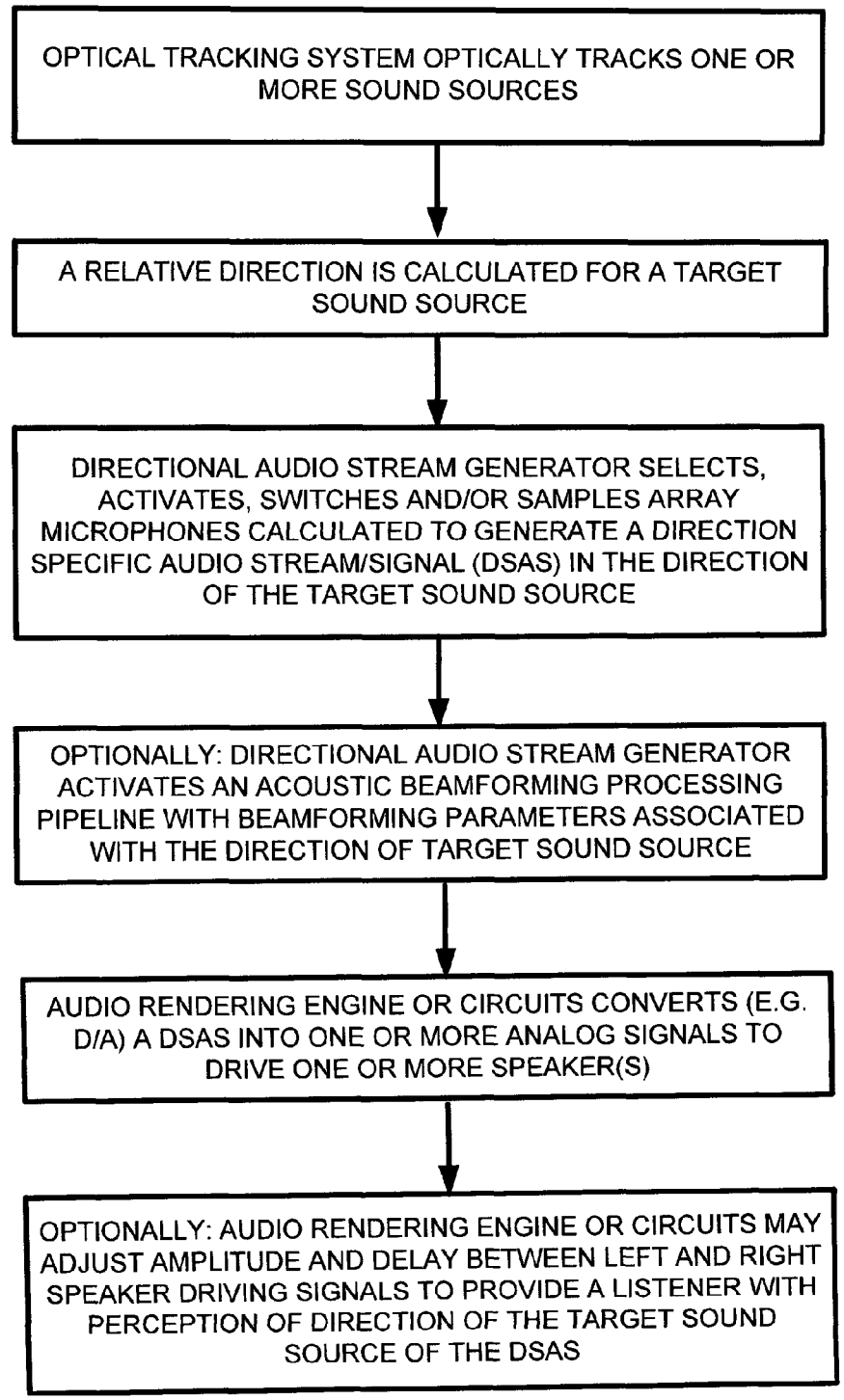
FIG. 1B shows a flowchart including exemplary steps of an acoustic signal acquisition device according to embodiment of the present invention.

FIG. 1B shows a flowchart including exemplary steps of an acoustic signal acquisition device according to embodiment of the present invention. The optical tracking system optically tracks one or more sound sources, also referred to a DSAS targets. A relative direction value, parameter or vector is calculated for a target sound source. The directional audio stream generator selects, switches-in, activates and/or samples array microphones calculated, estimated or otherwise determined to be usable for generating a direction specific audio stream/signal (DSAS) in the direction of the target sound source. Optionally, the directional audio stream generator activates an acoustic beamforming processing pipeline with beamforming parameters associated with the direction of the target sound source. An audio rendering engine or circuits converts (e.g. D/A) a DSAS into one or more analog signals to drive one or more speaker(s). Optionally, the audio rendering engine or circuits may adjust amplitude and delay between left and right speaker driving signals to provide a listener with perception of direction of the target sound source of the DSAS.

Figure 2A:
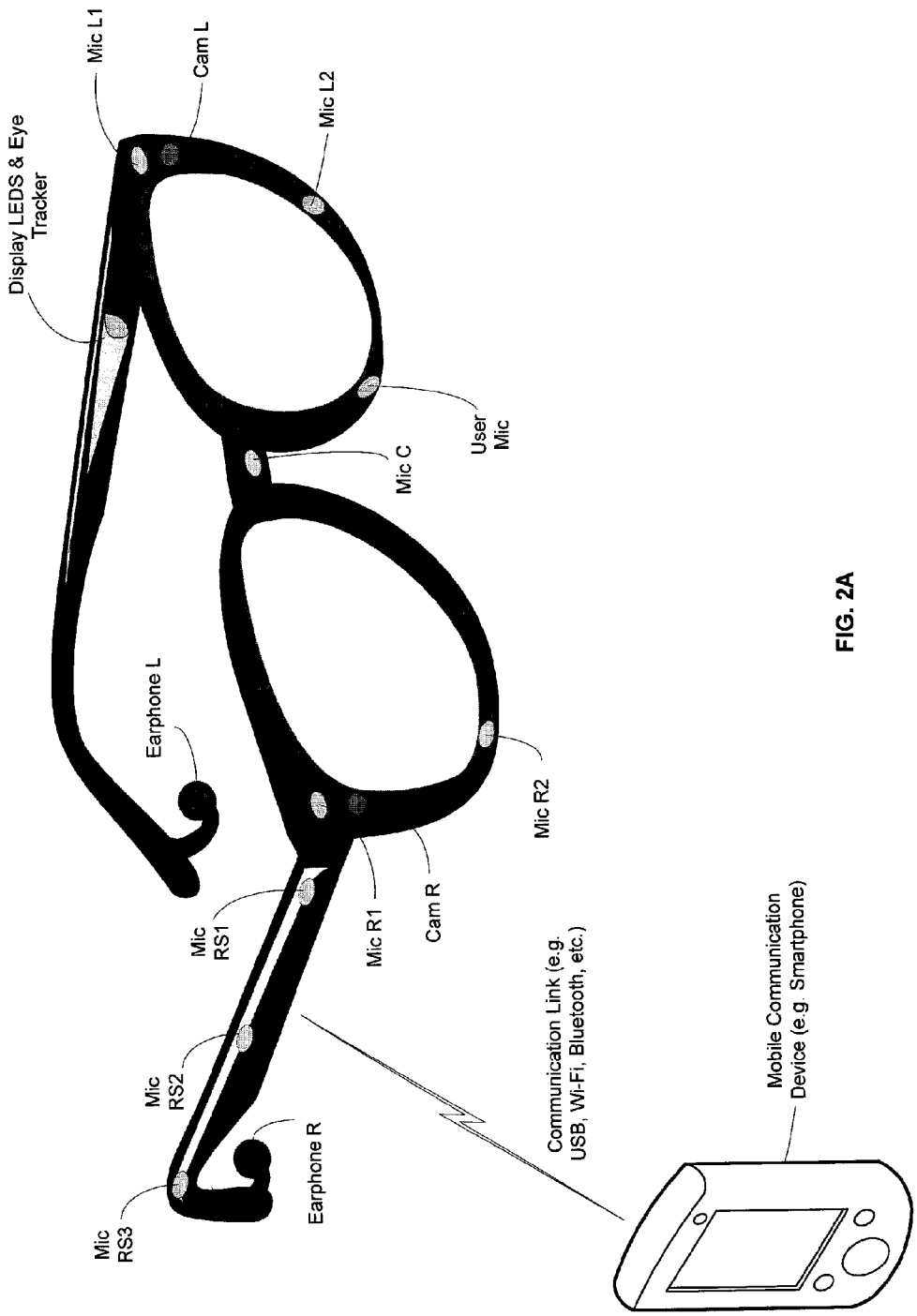
FIG. 2A shows a diagram of a device according to embodiments of present invention related to eyewear.

FIG. 2A shows a diagram of a device according to embodiments of present invention related to eyewear. According to this embodiment, the microphone array is be a wearable microphone array. A device holding the microphone array may be incorporated or otherwise functionally associated with any wearable device, optionally in the form of eyewear, headphones (FIG. 2C) or other headgear. At least a portion of the optical tracking system may also be incorporated or otherwise functionally associated with the same wearable device as the microphone array, shown as Cam R and Cam L. Some or all portions of the optical tracking system and/or associated circuits may be part of the same device as the microphone array. According to further embodiments, portions of the tracking and/or signal processing functionality may be performed by a functionally associated device such as a smartphone connected to the device by a wired or wireless communication link.

Figure 2B:
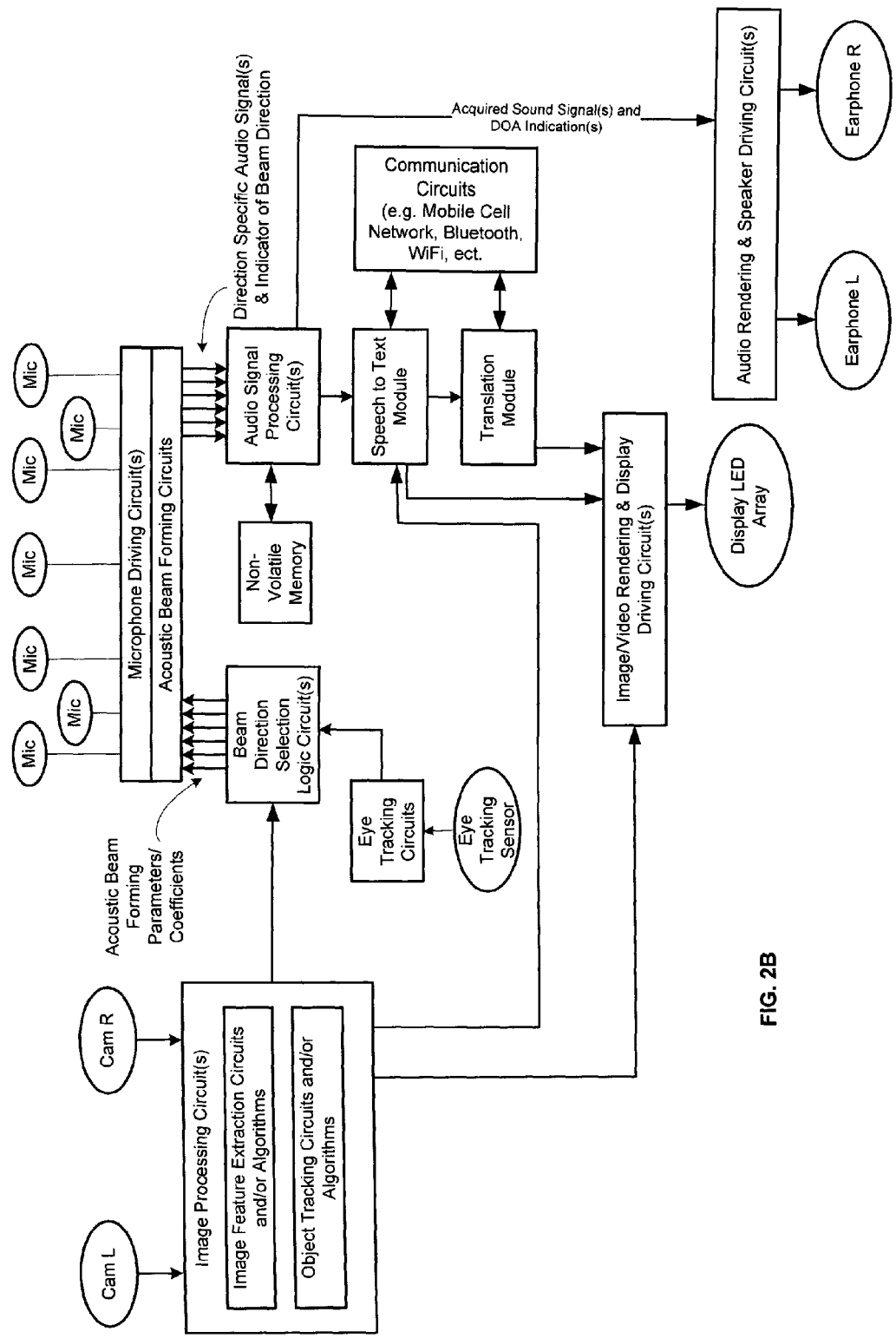
FIG. 2B shows an exemplary functional block diagram of the device according to FIG. 2A.

As shown in FIG. 2B, which is an exemplary functional block diagram of the device according to FIG. 2A, the eyewear may include an interface to an external communication device. The external communication device may provide for transcription (speech to text) and translation of directionally acquired speech within a DSAS. According to embodiments, the DSAS may be stored on a device's nonvolatile memory (NVM) device or on an online data NVM device. The DSAS may be provided to a speech to text engine, which speech to text engine may be incorporated into the device and/or may be part of a functionally associated communication device (e.g. smartphone). The speech to text engine may function independently or it may utilize an online speech to text service such as that provided by Google. According to yet further embodiments, the DSAS or text derived therefrom, may be provided to a language translation engine, for example the Google translate engine. Output of the text to speech engine and/or of the language translation engine may be stored. Output of the text to speech engine and/or of the language translation engine may be displayed on a display of the device. Output of the text to speech engine and/or of the language translation engine may be displayed on a display of a functionally associated device, such as a smartphone.

Figure 2C:
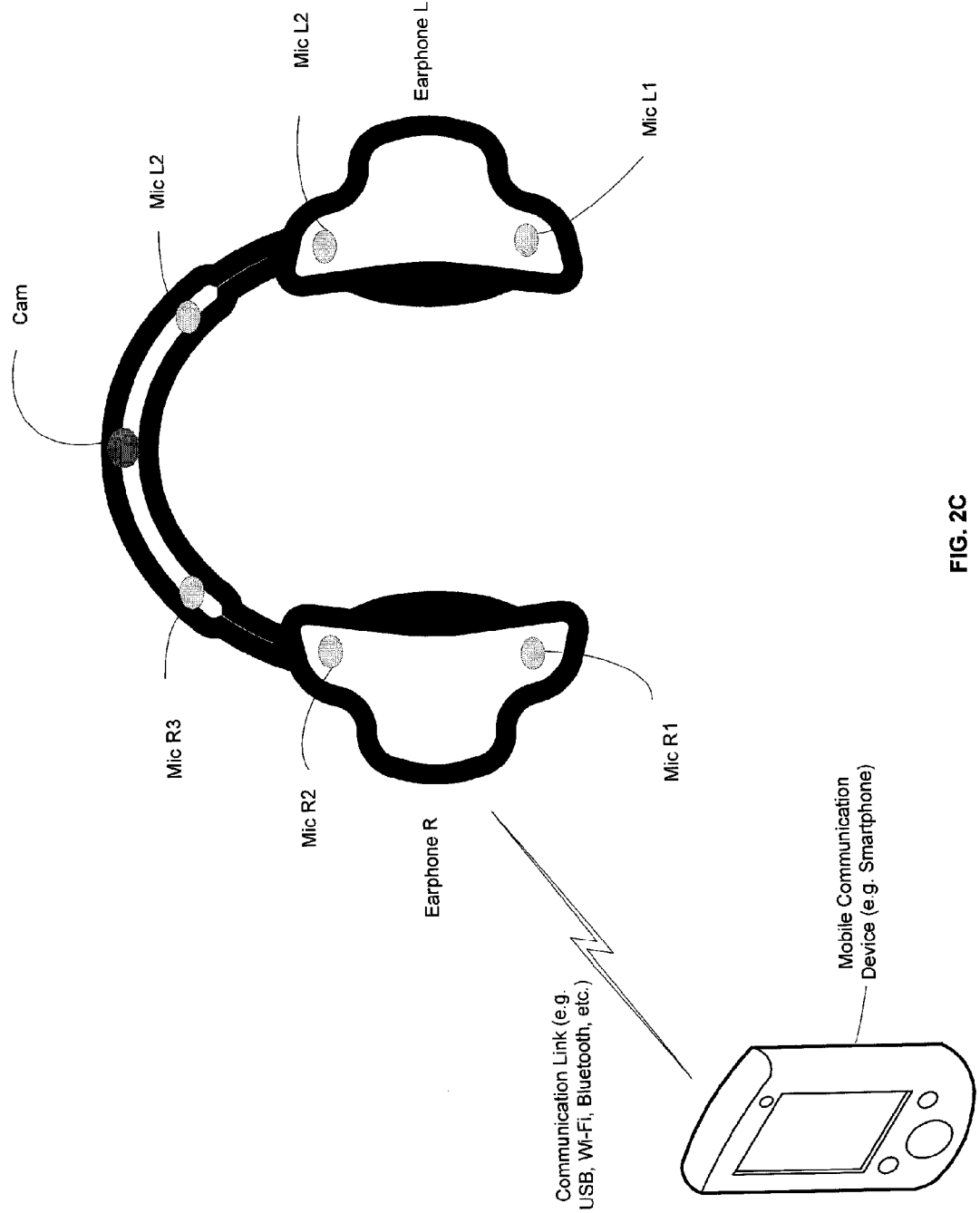
FIG. 2C shows a diagram of a device according to embodiments of present invention related to headgear, more specifically headphones.

FIG. 2C shows a diagram of a device according to embodiments of present invention related to headgear, more specifically headphones. This embodiment is similar to the one for eyewear, with the exception of not including an eye projection display.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A wearable device comprising:
a microphone array comprising two or more microphones positioned some distance from one another, wherein each of said microphones is adapted to convert acoustic signals into electrical signals;
a directional audio stream generator (DASG) adapted to convert electric signals output by one or more of said microphones into a first direction specific audio signal corresponding to acoustic signals having a first direction of arrival; and
an Optical Tracking System (OTS) comprising an optical sensor with a field of view directed towards a front of said wearable device and optical information processing circuits to process optical information acquired by said optical sensor, said OTS adapted to: (a) identify at least one optically detectable feature of a sound source within the field of view of said sensor, (b) estimate a relative direction of the sound source, and (c) generate at least one direction parameter used by said DASG to generate the first direction specific audio signal.

2. The device according to claim 1, wherein said DASG includes acoustic beamforming circuits.

3. The device according to claim 2, wherein said acoustic beamforming circuits are analog.

4. The device according to claim 2, wherein said DASG includes at least one analog to digital converter and said acoustic beamforming circuits are digital.

5. The device according to claim 1, wherein at least some of said microphones are directional and said DASG includes microphone selection circuits.

6. The device according to claim 5, wherein said DASG includes at least one analog to digital converter and digital signal combining circuits.

7. The device according to claim 6, wherein said digital electrical signal combining circuits include beamforming functionality.

8. The device according to claim 7, wherein said electrical signal combining circuits include background noise removal processing.

9. The device according to claim 1, wherein said OTS includes at least one forward looking camera and said optical processing circuits include feature identification processing to identify one or more features of objects or persons present in front of the device.

10. The device according to claim 9, wherein the one or more features is selected from the group consisting of a human torso portion, a human face, a human lip, a video presentation device, an audio presentation device, and any potential acoustic signal source.

11. The device according to claim 10, wherein said OTS further includes processing to estimate a direction parameter indicative of a direction corresponding to the one or more identified features.

12. The device according to claim 1, wherein said OTS includes an eye tracker for tracking a position of an eye of a wearer of said device.

13. The device according to claim 12, wherein said OTS further includes processing to estimate a direction parameter indicative of a direction corresponding to the position of the tracked eye.

14. The device according to claim 1, further comprising an audio rendering assembly including one or more audio speakers and an audio signal generator adapted to drive each of said one or more speakers.

15. The device according claim 14, wherein said audio signal generator is adapted to generate one or more audio signals based on the first direction specific audio signal.

16. The device according to claim 15, wherein said audio signal generator is adapted to generate a separate audio signal for each of two speakers, wherein a relative volume and delay between the separate signals is based on the first acoustic signal direction of arrival.

17. The device according to claim 14, wherein said audio signal generator includes background noise suppression circuits.

18. The device according to claim 14, wherein said audio signal generator includes ear specific signal customization circuits to adapt an audio signal based on a frequency sensitivity of a specific ear.

19. The device according to claim 1, wherein said OTS is adapted to: (1) track a change in relative direction between said device and an identified feature, and (2) update the at least one direction parameter used by said DASG to generate the first stream of audio data.

20. The device according to claim 19, wherein said OTS is adapted to track two or more identified features and to generate separate direction parameters for each of the two or more identified features.

21. The device according to claim 20, further comprising user interface circuits adapted to allow a wearer to select for which identified feature a direction specific audio signal is generated.

22. The device according to claim 21, wherein said interface circuits include a display selected from the group consisting of: (1) a functionally associated touchscreen, and (2) optical head mounted display.

* * * * *